United States Patent [19]

Yochum

[11] Patent Number: 4,618,015

[45] Date of Patent: Oct. 21, 1986

[54] REAR SWING ARM ASSEMBLY FOR THREE OR FOUR WHEELED OFF-THE-ROAD VEHICLE TRACK CONVERSION UNIT

[76] Inventor: Michael Yochum, P.O. Box 3303, Homer, Ak. 99603

[21] Appl. No.: 743,726

[22] Filed: Jun. 11, 1985

[51] Int. Cl.$^4$ .................................................. B62D 55/04
[52] U.S. Cl. .................................... 180/9.21; 180/9.25; 180/9.26
[58] Field of Search ...................... 180/9.21, 9.25, 9.26, 180/9.1, 210, 215, 216, 217

[56] References Cited

U.S. PATENT DOCUMENTS

| | | | |
|---|---|---|---|
| 1,697,915 | 1/1929 | Fast ..................................... | 180/9.26 |
| 2,074,389 | 3/1937 | Grant .............................. | 180/9.21 X |
| 3,318,403 | 5/1967 | Hansen ........................... | 180/9.25 X |
| 3,369,624 | 2/1968 | Kauffmann ......................... | 180/9.24 |
| 3,667,562 | 6/1972 | Compton ......................... | 180/9.25 X |

Primary Examiner—John A. Pekar
Attorney, Agent, or Firm—Sughrue, Mion, Zinn, Macpeak, and Seas

[57] ABSTRACT

A triangular shaped light weight metal plate is pin connected at a front apex end to the rear of the chassis of a three or four wheeled off-the-road, vehicle intermediate of the vehicle rear wheels, for pivoting about a horizontal axis. The widened rear base portion of the triangular-shaped plate supports to opposite sides, axles for mounting a pair of conversion unit wheels for rotation about horizontal axes and in line with the rear wheels of the off-the-road vehicle. An air shock cylinder is pivotably coupled at one end to the vehicle chassis in line with and above the pin connection of the front apex end of the rear swing arm plate and at the other end, at the rear to a bracket on the plate, centered between the wheels and projecting upwardly of the swing arm plate. Endless tracks sized to and enveloping the vehicle rear wheels and the conversion unit wheels to respective sides convert the three or four wheeled off-the-road vehicle for use on boggy ground, for hill climbing, and by a suitable ski attachment to the vehicle front wheel or wheels, for use in heavy snow.

7 Claims, 3 Drawing Figures

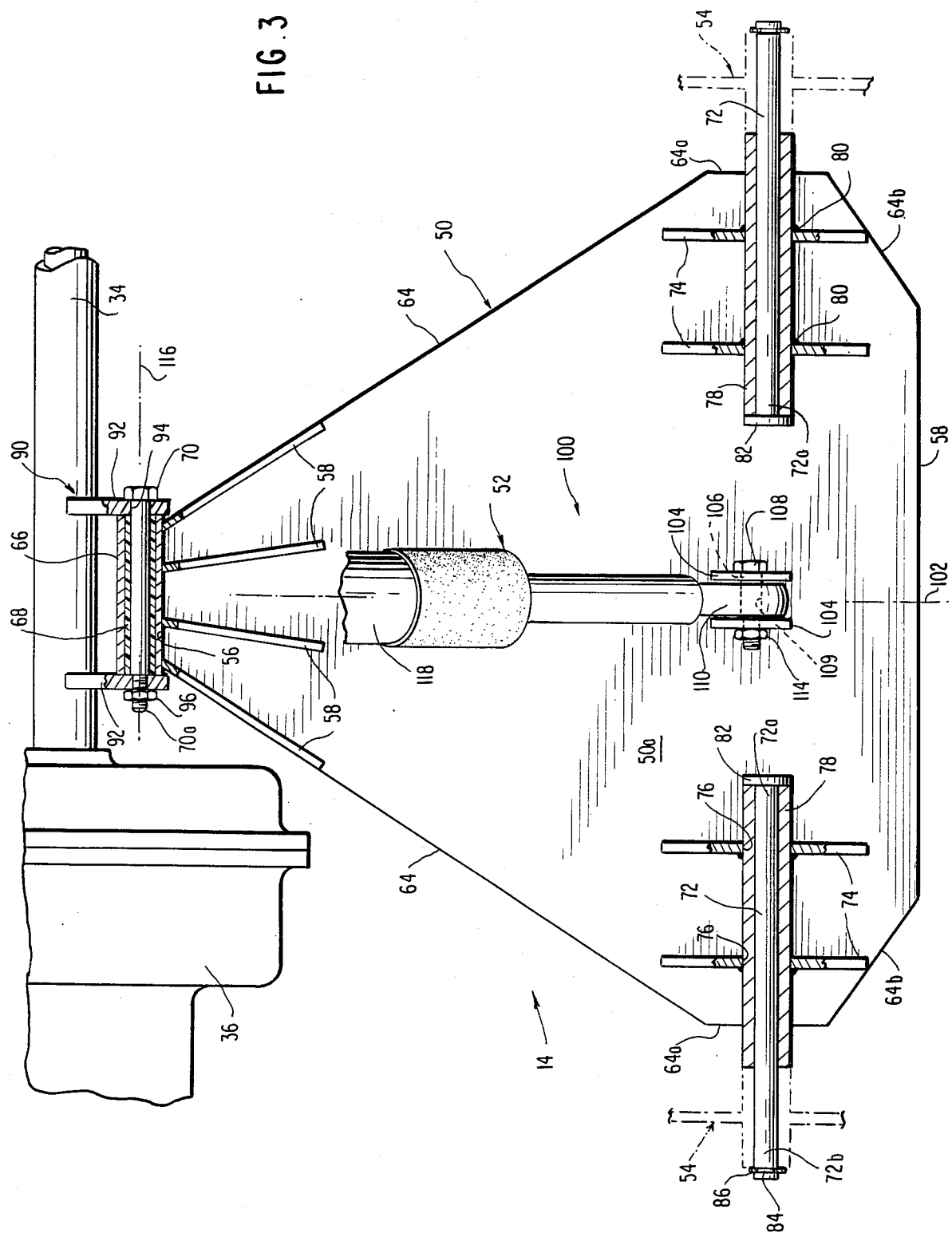

REAR SWING ARM ASSEMBLY FOR THREE OR FOUR WHEELED OFF-THE-ROAD VEHICLE TRACK CONVERSION UNIT

FIELD OF THE INVENTION

This invention relates to three or four wheeled off-the-road vehicles, and more particularly, to a rear swing arm assembly for a track conversion unit which is readily mounted to and removed from the off-the-road vehicle.

BACKGROUND OF THE INVENTION

Three wheeled off-the-road vehicles are provided with relatively wide rear wheels and permit hunters, fishermen and the like to use these vehicles to traverse rugged terrain and to reach remote areas. While such off-the-road vehicles are capable of traversing fairly rugged terrain, they are unable, absent modification, to travel over snow or swamps, owing to the lack of traction and the tendency of the vehicle wheels to sink into the swampy snow or ground.

Attempts have been made to provide conversion units for vehicles such as motorcycles, and even to create specially formed endless track vehicles capable of achieving those ends. These developments have emanated from the early snowmobile, as evidenced by U.S. Pat. No. 2,074,389 to Grant issued Mar. 23, 1937. The snowmobile of that patent constituted a conversion of a standard automobile or truck and involves the replacement of the vehicle front wheels by a pair of runners coupled to the steering wheel mechanism of the vehicle. The rear tires of the truck or automobile are removed, and the rear driving wheels modified to include teeth projecting radially of a disc or wheel and engaging a traction chain which, in turn, is looped about a further auxiliary wheel to a respective side of the vehicle rearward of the automobile or truck drive wheel, so modified. Thus, a pair of endless tracks protrude rearwardly from the conventional automobile or truck. The auxiliary wheels act as idlers and are mounted to the same chassis or a chassis extension frame. The tracks drive the vehicle over the snow.

Such concepts have been applied to motorcycles to convert the motorcycles into snowmobiles through the use of a conversion unit, as evidenced by U.S. Pat. No. 3,667,562 issued June 6, 1972. In that patent, the front and rear wheels of the motorcycle are simply discarded. A special tubular chassis frame is incorporated into the bottom of the motorcycle chassis and functions as an extension thereof to support a pair of endless tracks. The central drive system via chains and sprockets, is connected to the original sprocket chain drive system for the motorcycle rear wheel axle. Such conversion systems actually emasculates the motorcycle, provides major modifications to the motorcycle structure, and renders conversion time consuming. In addition, the tubular frame assembly, tracks, etc., are fairly complicated and expensive.

U.S. Pat. No. 3,318,403 to Hansen issued May 9, 1967, is suggestive of a simpler approach when modifying a motorcycle or motor bicycle to a vehicle capable of operating in the snow. In that respect, a simple clamping arrangement is employed to clamp a single ski to the front wheel of the bicycle borne by a fork assembly and operated by handle bars which are maintained in place. These means constitute a minor modification to the machine and one which can be accomplished in a matter of minutes. Further, U.S. Pat. No. 3,318,403 utilizes a rear driving assembly mounted to the rear end of the bicycle frame and taking the form of a framework supporting both the drive shaft and power sprocket, and a pair of horizontal transverse jack shafts journaled on the outermost of the paired vertical members with the lower ends of a pair of shock absorbers coupled to the pair of jack shafts. The machine incorporates a plurality of driven wheels on the outermost ends of the driven shaft with a pair of endless threads disposed on the wheels to opposite sides of the framework. While the snow bicycle is capable of functioning and moving adequately through fairly heavy snows, the components particularly at the rear of the snow bicycle are again quite complicated and involve the utilization of three open barrel or basket wheels to each side of the tubular frame assembly and the replacement of the normal rear wheel on the bicycle or motorcycle itself.

In U.S. Pat. No. 3,369,624 to Kauffmann issued Feb. 20, 1968, there is shown a vehicle capable of driving over deep snow or sand, specially formed and not as a conversion unit for an existing vehicle, which makes use of a track system mounted to each side of the vehicle at the rear ans which includes drums located forwardly of the rear wheels and swingable about the wheel axis about which the rear wheels forming endless bands pass. The bands are provided with scrapers for digging into the ground, which engage projecting tread portions of the rear wheels for forcibly driving the tracks under conditions in which the drums function essentially as idlers.

The applicant has devised a system which is based on the principles set forth in Kauffmann U.S. Pat. No. 3,369,624 for providing, to an existing three or four wheeled off-the-road vehicle, the capability of permitting the vehicle to operate in deep snow or sand or to provide additional traction when moving up steep terrain, as an attachment, which may be readily connected and disconnected to the vehicle, using a limited number of components.

It is, therefore, a primary object of the present invention to provide an improved unitary, platelike swing arm assembly for a three or four wheeled off-the-road vehicle track conversion unit which may be readily pivotably mounted to and dismounted from the rear of the vehicle, i.e., to the transmission casing, axle or chassis frame through a simple two bolt mounting system, and which utilizes a single pivot shock system for facilitating the maintenance of paired endless tracks from the rear wheels of the vehicle to auxiliary wheels mounted to the rear of the platetype swing arm to opposite sides thereof and to which the single pivot shock is centered between the auxiliary wheel axles.

SUMMARY OF THE INVENTION

The present invention is directed to a unitary, platelike swing arm assembly detachably mounted to the rear of a three or four wheeled off-the-road vehicle at its center by a pivotable pin connection to the transmission casing, axle or chassis frame. A unitary platelike swing arm of generally triangular plan configuration has one apex pin connected to the rear center of the cassis and diametrically opposite apices at a rear base portion supporting axle means projecting outwardly of the platelike swing arm to opposite sides and adjacent the base of the platelike swing arm. Auxiliary wheels are mounted for rotation to respective axles in line with the vehicle rear wheels and to respective sides. Endless track means are borne by the vehicle rear wheels and auxiliary wheel pairs, the track means including cleats engaging the circumferential tread portions of the vehicle rear wheels and the auxiliary wheels such that the vehicle drive wheels forcibly drive the tracks over the terrain. The track conversion unit includes a single pivot shock system in the form of an air cylinder having one end pivotably mounted to the unitary, platelike swing arm along its base and generally in line with the axle means projecting outwardly of the platelike swing arm and centered therebetween. The air cylinder is pivotably mounted to the vehicle chassis at its rear center and in line with the pivot connection between the front apex of the platelike swing arm and the rear center of the vehicle chassis. As such, via a simple two bolt mounting, the unitary platelike swing arm bearing the pair of auxiliary wheels may be attached and detached from the three or four wheeled off-the-road vehicle at its rear, with tracks to opposite sides enveloping the peripheries of the vehicle rear wheel and auxiliary wheel pairs to opposite sides of the vehicle. Preferably, the unitary platelike swing arm is formd from aluminum sheet stock to minimize the weight of the track conversion unit.

BRIEF DESCRIPTION OF THE DRAWINGS

FIG. 3 is a top plan view, partially broken away, of the platelike swing arm assembly of FIG. 2.

DESCRIPTION OF THE PREFERRED EMBODIMENT

Figure 1:
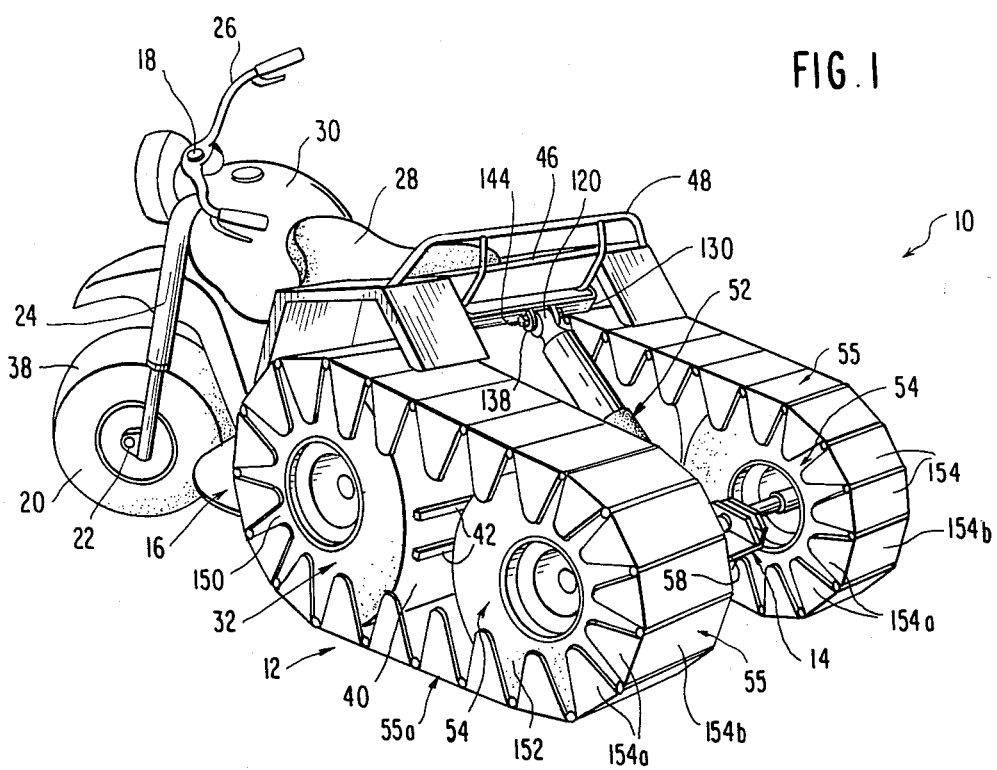
FIG. 1 is a perspective view of a three wheeled off-the road vehicle having detachably coupled thereto a track conversion unit incorporating the unitary, platelike rear swing arm assembly forming a preferred embodiment of the present invention.

Referring to the drawings, there is illustrated a three wheeled, off-the-rod vehicle indicated generally at 10, which is modified for movement over the relatively soft, wet and boggy swamp by the addition of a track conversion unit, indicated generally at 12, whose principal component is constituted by a unitary, platelike area swing arm assembly, indicated generally at 14. The three wheeled off-the-road vehicle may be a vehicle manufactured by Honda Corporation and typically termed "a three wheeler". Such vehicles are of motorcycle style, incorporating a motorcycle body or chassis, indicated generally at 16, and mounting at the front, by way of a steering shaft 18, a single front wheel 20 which rotates about a horizontal axle 22 borne by forks 24 of the shaft 18 which shaft 18 terminates at its upper end in handle bars 26.

A seat 28 is provided on the chassis 16 behind a fuel tank 30, and the vehicle is characterized by a pair of relatively large rear, drive wheels 32 mounted for rotation on a horizontal axle 34, borne by chassis 16, forming a component of the transmission system including transmission 36. The vehicle utilizes fairly large pneumatic tires. The front wheel 20 includes a front tire 38 and rear wheels 32 utilize relatively wide, large diameter pneumatic tires 40 which are characterized by a knobby tread of cleatlike configuration formed by a number of transverse, radially projecting bars or cleats 42 within the tire tread. A rear housing 46 to the rear of seat 28 extends between the rear wheels and bears a rack as at 48 for carrying supplies and the like. The make up of the three wheeled off-theroad vehicle 10 is purposely not detailed since such vehicles are guite conventional and the invention has general application to these modified motorcycle type three and four wheeled off-theroad vehicles capable of mounting to track conversion units.

Track conversion units, in the general sense are presently in vogue for such three or four wheeled off-the-road vehicles, and take the form of those set forth in the patents discussed previously. Such off-trail motorcycles, however, have difficulty in crossing marshy land and snow covered terrain. Further, it has been determined that the traction provided to the vehicle when +climbing steep inclines is often inadequate without modification and the employment of track conversion units. Such units incoporate additional auxiliary wheels positionable in line with the paired rear driving wheels of the three or wheeled off-theroad vehicle and linked to the rear drive wheels of the off-theroad vehicle by endless tracks to provide extended traction surfaces and in which the auxiliary wheels are driven by the rear wheels of the off-the-road vehicle itself, with additional traction provided by the tracks to facilitate vehicle use in winter time on snow fields, as well as their use in swampy boggy terrain during the non-winter months.

The track conversion unit, indicated generally at 12, takes the form of a rear swing arm assembly 14. Assembly 14 includes as principal components a swing arm, indicated generally at 50, a single air shock cylinder indicated generally at 52, and a pair of auxiliary wheels indicated generally at 54. The rear swing arm 50 is a unitary, planar member or plate of modified triangular shape in plan configuration, FIG. 2, formed of sheet aluminum stock which may be ¼ or ½ inch in thickness and is oriented such that apex front end 56, remote from base or rear end 58, mounts to the rear of the vehicle chassis 16, as for instance by rear drive axle 34, transmission 36, integrated to axle 22, or frame member 62 of chassis 16.

Arm 50 includes opposed diagonal side edges 64, rearwardly of apex front end 56, which are flattened as at 64a near rear end base 58. Further, the side edges terminate in reverse diagonal side edge portions 64b intersecting rear end 58 of the swing arm 50. At apex front end 56, there is horizontally welded an aluminum sleeve or tube 66 having an outside diameter, for instance, of one and one-half inches with its axis parallel to front end 56, and rear end 58 of the rear swing arm 50. Further, reinforcing strips 58 are formed integrally or welded to top and bottom faces of the rear swing arm 50 and extend from sleeve or tube 66 outwardly of the tube to reinforce the platelike rear swing arm 50 at its narrowed, front end 56.

The sleeve or tube 66 carries a one inch diameter nylon bushing 68 through which projects a one-half inch mounting bolt 70 for mounting the rear swing arm 50 to the rear of the vehicle 10. The rear swing arm 50 is provided with paired axles as at 72 upon which mount auxiliary wheels 54. To provide a stable mount for axles 72, the platelike rear swing arm 50 carries vertical mounting strips 74 welded to the top face 50a of the rear swing arm parallel to the side edge portions 64a of swing arm 50. Strips 74 are spaced for instance four inches from each other, with the mounting strips 74 being about eight inches in length. The strips 74 carry aligned circular holes as at 76, through which project axle mounting sleeves 78 of an outside diameter slightly less than the diameter of holes 76, the sleeves 78 being welded to the mounting strips 74 as at 80.

Axles 72, which may be ¾ inch steel stock, are provided with collars 82 at their inboard ends 72A, while at their outboard ends 72b they are grooved as at 84 and receive ¾ inch circlips as at 86 outside of auxiliary wheels 54. The auxiliary wheels 54 are sized to the axle or shaft 72 so as to rotate about the axis of axles 72.

As may be appreciated, the auxiliary wheels 54 abut the ends of mounting tubes or sleeves 78 and are held onto the axle 72 by way of circlip 86.

For purposes of illustration, the mount of the plate-like rear swing arm 50 is shown as being pin connected via bolt 70 to rear axle 34 of the three wheelded off-the-road vehicle 20. Axle 34 extends transvesely across the rear of the vehicle and supports the rear drive wheels 32 of vehicle 10. In that respect, a bracket indicated generally at 90 is welded or otherwise fixed to the rear axle 34 at the longitudinal center line of the vehicle 10 and, of course, centered relative to vehicle rear wheels 32 so that the auxiliary wheels 54 are in line with the vehicle rear wheels 32.

In simplified form, the bracket 90 is constituted by paired plates 92 which are laterally spaced so that their inside surfaces are spaced slightly in excess of 3½ inches which is the length of sleeve or tube 66. The plates 92 have aligned holes 94 drilled therein, the holes 94 being on the order of the diameter of the ½ inch bolt 70. With bolt 70 in place, the sleeve 66 and the nylon bushing 68 interposed between bracket plates 92, the bolt 70 is inserted through holes 94 within plates 92 such that the threaded end 70a projects from the left side plate 92. A lock nut 96 completes the assembly.

As may be appreciated, the utilization of cotter pins or other fastener means may be employed to insure that once a bolt connection is made, of the front end of the rear swing arm 50, the pivot mounting of that end of the swing arm is maintained until disassembly of the conversion unit is effected.

Alternatively, as mentioned previously, the front end 56 of the rear swing arm 50 may be pin or bolt connected to the transmission casing, or the chassis frame, particularly the transmission casing if the transmission casing is at the center of the rear axle. Alternatively, the connection can be made to any part of the chassis frame by way of a suitable bracket such as bracket 90 or paired parallel plates such as plates 92 which may be welded to the frame to opposite sides of the vehicle longitudinal centerline, near the bottom of the chassis.

Figure 2:
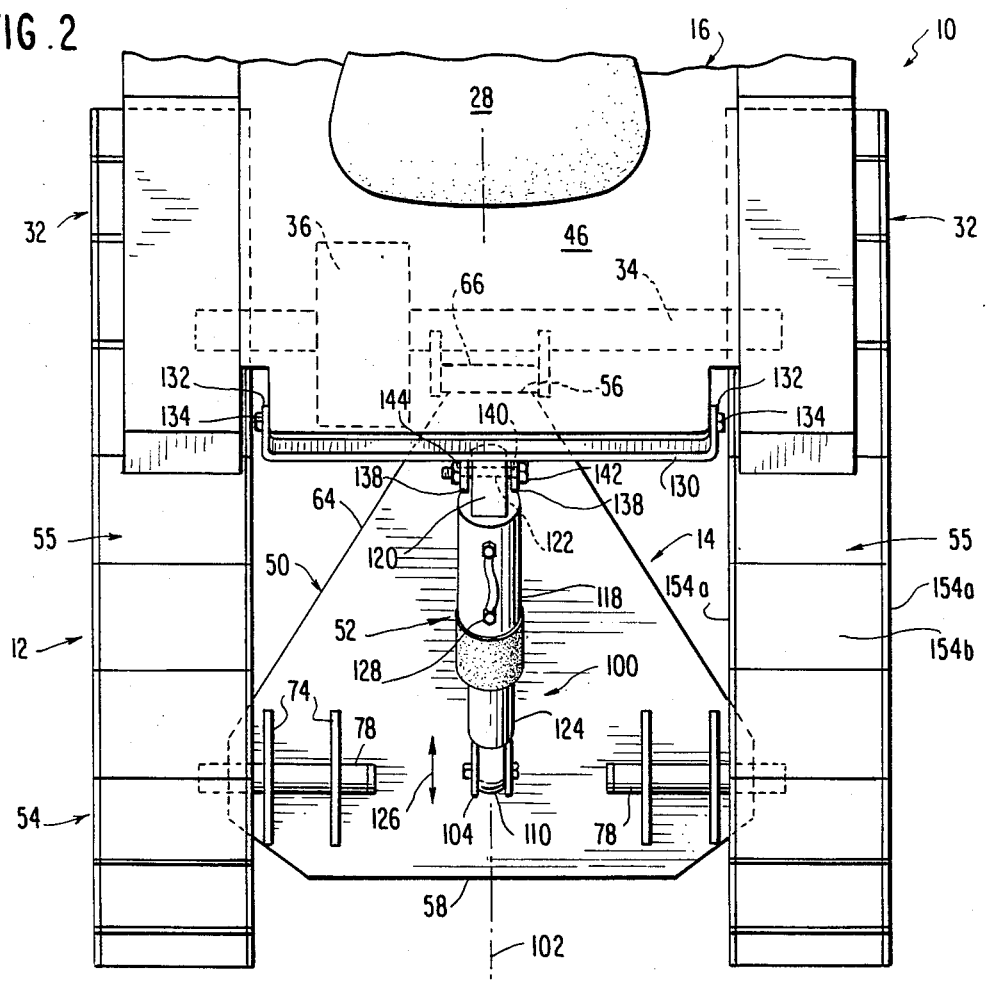
FIG. 2 is a top plan view of the vehicle and track conversion unit of FIG. 1.

Referring particularly to FIG. 2, the present invention is particularly keyed to the incorporation of a single pivot shock system, indicated generally at 100, for shock mounting of the rear swing arm 50 to the three wheeled off-the-road vehicle 10. In that respect, the single pivot shock system 100 comprises an air cylinder indicated generally at 52 which is aligned with the longitudinal axis 102 of the vehicle and is mounted at its forward end to the rear of vehicle chassis 16, while the rear end of the air cylinder 52 pivotably connected to the rear swing arm 50 adjacent rear end 58.

In that respect, the platelike rear swing arm 50 carries a pair of vertical, laterally spaced aluminum plates 104 welded or otherwise fixed or integrated to face 50a of the rear swing arm 50 and positioned equally to opposite sides of the longitudinal centerline 102, aligned with the centerline of the vehicle 10. The plate 104 bear a pair of aligned circular holes 106 through which horizontally projects a pin or bolt 108. The bolt passes through a similar sized hole 109 of an end coupling 110 for the air shock cylinder 52. A lock nut or other fastener 114 is mounted to the projecting end of the bolt 108, passing through the other vertical plate 104. It is preferred that this end of the air shock cylinder 52 be permanently pivotably connected to the rear swing arm 50 and that the disconnect for both the rear swing arm 50 and the air shock cylinder 52 take place at the front part of these components of assembly 14.

As may be appreciated, plates 104 function as a bracket mount for one end of the air shock cylinder 52. Alternatively, instead of plates 104 being welded to the top face 50a of the rear swing arm 50, a U-shaped bracket may have its base welded to the top face 50a of that member.

The air shock cylinder 52 functions as a conventional shock absorber. That is, as the vehicle rides over the terrain and the rear swing arm 50 pivots via the pin or bolt 70 at its front edge 56 via sleeve or tube 66 and nylon bushing 68, with rise of the rear swing arm 50 resisted by the air shock cylinder 52. In this fashion, auxiliary wheels endless tracks 55 borne thereby are capable of rocking about a horizontal axis 116 defined by mounting bolt or pin 70 to fore and aft irregularity in the terrain which the vehicle 10, modified by the track conversion unit 12, encounters.

The air shock cylinder 52 is constituted by a main cylinder portion 118, being provided with a reduced diameter coupling element 120 at its forward end bearing a transverse bore or hole 122. The main cylinder portion 118 carries an extensible rod 124 which is projectable and retractible as indicated by double headed arrow 126, FIG. 2, as the rear of the conversion unit rides over the terrain traversed by the vehicle 10.

Compressed air is slowly released within to the main cylinder portion 118 via fitting 128 such that any movement of the swing arm vertically upwardly carrying the auxiliary wheels 54 and track 55 is resisted by a piston (not shown) internally of the main cylinder 118 acting on the mass of compressed air within the main cylinder portion 118 behind the piston fixed to rod 124.

To effect the second of the simple two bolt coupling or mounting of the rear swing arm assembly 14 to vehicle 10, the vehicle 10 behind seat 28 has, mounted to chassis 16, a shallow U-shaped mounting strap 130 which terminates at opposite ends in right angle terminal portions 132 which are bolted by bolts 134 to opposite sides of rear housing 46 of chassis 16, adjacent luggage rack 48. Spaced parallel plates 138 project rearwardly from the U-shaped strap 130 at the cente thereof, to opposite sides of the vehicle longitudinal axis or centerline 102. Plates 138 carry aligned circular holes 140 through which project a coupling bolt 142. Bolt 142 passes through appropriately sized hole 122 within the reduced diameter fitting 120 of air shock cylinder 52. A lock nut 144 is threaded to the projecting end of bolt 142 so as to demountably pin connect air shock cylinder 52 at its forward end to the vehicle 10. Thus, the pivot connection of the air shock cylinder 52 is made at longitudinally aligned central positions of the vehicle and swing arm, respectively.

The endless tracks 55 are trained about the pneumatic tires 150 for the vehicle rear wheels 32 and the auxiliary wheels 54, respectively. In that respect, pneumatic tires 150 are mounted to vehicle rear wheels 32, and pneumatic tires 152 to auxiliary wheels 54 of track conversion unit 12. the auxiliary wheels 54, the auxiliary pneumatic tires 152, the air shock cylinder 52, and the endless tracks 55 are commercially available items for the conversion unit 12 and may be purchased in the marketplace. Specifically, the endless tracks 55 are formed of hinged links 154, essentially rectangular in configuration and being hinge coupled to each other. The tracks 55 are slightly wider than the pneumatic drive tires 150 of the three wheeled vehicle 10 and the auxiliary tires 152. The individual links 154 are generally Ushaped and include side portions 154a which extend at right angles to base portions 154b so as to encompass the sides of the tires 150, 152 during rotation of the endless track 55. Further, the tracks 55 are purposely formed so that the links 154 engage the radially projecting portions of the tire tread on the periphery of pneumatic tires 150, 152 in a manner that the endless tracks 55 are positively driven as the rear wheels 32 of the off-the-road vehicle 10 are engine driven. In turn, the tracks 55 effect positive drive rotation of the pneumatic tires 152 for auxiliary wheels 54.

From the above, it may be appreciated that the endless tracks 55 are purposely sized by adding or removing links to insure that the tracks tightly engage the pneumatic tires 150 and 152 about which they are trained for effectively increasing the traction drive surface of the vehicle by the extent of the lower run 55a, FIG. 3, of the endless tracks 55 which contact the boggy surface, snow field or the like during vehicle use.

Further, it may be appreciated that while the unitary, platelike rear swing arm 50 has been described as formed of aluminum sheet stock with reinforcing strips or ridges 58 welded to the rear swing arm 50 as well as axle mounting plates 74 and air shock cylinder coupling plates 104, all of these member may be integrally formed with the rear swing arm 50 by casting the rear swing arm of suitable metal with these elements molded into the plate member. Further, while bolt and nut means are shown as effecting the quick, simple dual pivot pin attachment of the rear swing arm assembly 14 to vehicle 10, such coupling may be achieved by the utilization of smooth surface pins replacing the bolts and through the utilization of cotter pins or other positive locking means at the end of the pivot pin, opposite the headed ends under conventional practice.

While the invention has been particularly shown and described with reference to a preferred embodiment thereof, it will be understood by those skilled in the art that various changes in form and details may be made therein without departing from the spirit and scope of the invention.

What is claimed is:

1. A unitary, platelike swing arm assembly for detachable mounting to the rear of a three or four wheeled off-the-road vehicle at its center, said assembly comprising:

a unitary platelike swing arm of generally triangular plan configuration, said swing arm having a front apex end and a rear base end, means carried by said platelike swing arm at its front apex end for pivotably connecting the front apex end to the rear center of the vehicle for pivoting about a horizontal axis, means fixedly mounting axle means to said platelike swing arm at said base end, to opposite sides thereof, auxiliary wheels mounted for rotation about said axle means to opposite sides of said unitary platelike swing arm at positions for alignment with the vehicle rear wheels such that endless track means borne by the vehicle rear wheels and the auxiliary wheels in frictional engagement with the tread portions of the vehicle rear wheels and the auxiliary wheels provide added traction with the track means being driven by the vehicle rear wheels, and said assembly further comprising a single pivot shock system constituting an air cylinder having one end pivotably mounted to the unitary, platelike swing arm at said base end and centrally between said auxiliary wheels, and means carried by said air cylinder for pivotably mounting the other end thereof to the vehicle chassis at its rear center and in line with the pivot connection at the front apex end of the platelike swing arm to the rear center of the vehicle chassis; such that by a simple two point mounting, the unitary platelike swing arm assembly may be attached and detached readily from the off-the-road vehicle.

2. The unitary platelike swing arm assembly as claimed in claim 1, wherein said means for pivotably mounting the front apex end of said platelike swing arm to the rear center of the vehicle chassis comprises a sleeve fixedly mounted to said swing arm parallel to the base end and a nylon bushing carried internally of said sleeve, such that said sleeve may be positiond between paired vertical plates projecting rearwardly of the vehicle chassis bearing aligned holes sized to a bolt or pin projectable through said sleeve and the nylon bushing to form a front end pin connection of said assembly to the off-the-road vehicle.

3. The unitary platelike swing arm assembly as claimed in claim 2, wherein said swing arm comprises a sheet metal plate, and wherein laterally spaced ribs are carried by said plate along at least one of a top and bottom surface thereof at said front apex end of said swing arm and extending from said sleeve towards said base portion, for reinforcing the front apex end of said swing arm.

4. The unitary platelike swing arm assembly as claimed in claim 1, wherein said swing arm includes a pair of laterally spaced vertical axle support plates fixed to the top face of said swing arm to opposite sides thereof, parallel to the longitudinal axis of the swing arm and at right angles to the base end, aligned holes within said support plates, a sleeve projecting through said aligned holes and being fixed to said pair of support plates, said axles projecting through said sleeves and having ends projecting beyond the ends of said sleeves outwardly of said swing arm, said projecting ends of said axles bearing said auxiliary wheels and means for maintaining said axles within said sleeve and said auxiliary wheels rotatably mounted on said projecting ends of said axles.

5. The unitary platelike swing arm assembly as claimed in claim 4, wherein said means for maintaining said axles within said sleeves and said auxiliary wheels on said axles comprises collars on said axles at the ends remote from said wheels, grooves within said axles at the outboard projecting ends of said axles, and circlips carried by said grooves such that said wheels abut to one side, the end of said sleeves, and to the other side, the circlips.

6. The unitary platelike swing arm assembly as claimed in claim 5, further comprising mounting bracket means carried by said platelike swing arm adjacetn said base portion, in line with said apex end, said bracket means including paired laterally spaced vertical upright plates, aligned holes within said plates, and pivot pin means projecting through said aligned holes of said laterally spaced vertical upright plates, and a fitting at one end of said air cylinder projecting between said plates and receiving said pivot pin means.

7. The unitary platelike swing arm assembly as claimed in claim 6, further comprising a shallow U-shaped mounting strap having an elongated base portion sized to the width of the vehicle chassis rearwardly of the vehicle seat, paired arms integral with said base portion and projecting at right angles thereto, at opposite ends thereof, aligned holes within said arms for bolt mounting of said shallow strap arms to said vehicle chassis at a position above the apex end connection of said unitary platelike swing arm to said vehicle chassis, and at the rear center thereof, paired parallel plates projecting outwardly of said U-shapd mounting strap to the opposite side from said spaced strap arms, aligned holes within said plates, and pivot pin means projecting through said aligned holes and through a second terminal end of said air cylinder, at the end opposite that terminal connecting said air cylinder to said unitary platelike swing arm.

* * * * *